Figures 1, 2:
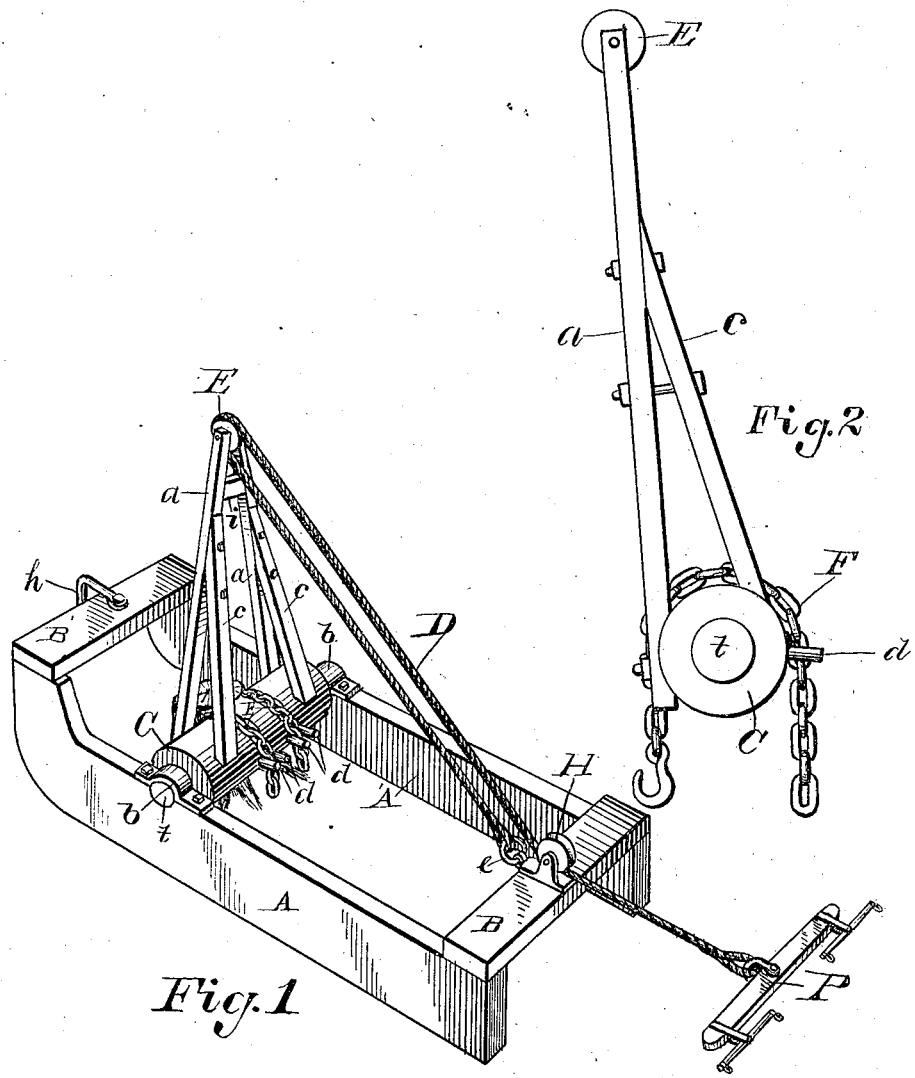

(No Model.)

J. D. CHENOWETH.
STUMP EXTRACTOR.

No. 254,613. Patented Mar. 7, 1882.

Attest
Paul A. Staley
Frank Johnson

Inventor
James D. Chenoweth
BY
National Scientific Association
Attorney

UNITED STATES PATENT OFFICE.

JAMES D. CHENOWETH, OF ALVIN, ILLINOIS.

STUMP-EXTRACTOR.

SPECIFICATION forming part of Letters Patent No. 254,613, dated March 7, 1882.

Application filed January 28, 1882. (No model.)

*To all whom it may concern:*

Be it known that I, JAMES D. CHENOWETH, a citizen of the United States of America, residing at Alvin, in the county of Vermillion and State of Illinois, have invented a new and useful Improvement in Stump-Extractors, of which the following is a specification.

My invention relates to an improvement in stump-extractors; and the object of my invention is to provide a device for pulling stumps, which shall be simple and inexpensive in construction and operation, and so arranged that it shall always be ready for operation and may be readily moved from place to place.

The device will be readily understood from the following description, with reference to the accompanying drawings, which form a part of this specification, and in which—

Figure 1 is a perspective view of my device shown in the act of pulling a stump. Fig. 2 is a detailed view of some of the parts referred to hereinafter.

Similar letters refer to similar parts in the different views.

On the main frame of the device, consisting of the side pieces, A and A', connected at each end by the cross-pieces B B', is mounted a roller, C, provided at each end with a trunnion, $t$, resting in a bearing, $b$, in the side pieces, A and A'.

Bolted to the roller C at their lower ends, and converging at their upper extremities and connected by a cross-piece, $i$, are two levers, $a\ a$, to which are bolted the upper ends of braces $c\ c$, the lower ends of which are mortised into the roller C, as shown in Fig. 2 of the drawings.

Between the upper ends of the levers $a\ a$ is a sheave, E, mounted in suitable bearings, around which passes a rope, D, one end of which is made fast in a ring, $e$, attached to the cross-piece B of the main frame. The other, passing under a sheave, H, also attached to the cross-piece B, is made fast to a double-tree, P, to which horses are attached, or to any other convenient source of power.

Extending partly around the roller C are chains F, provided with suitable hooks for engaging with the stump to be extracted, and attached to said roller by slipping one of the links of the chain or chains between the pins $d\ d$, secured in the roller for this purpose.

The side pieces, A and A', are rounded off at their forward ends after the manner of the runners of a sled, and a clevis, $h$, attached to the front cross-piece, B', for the purpose of hitching the horses thereto when it is desired to move the device from one stump to another.

The mode of operation is as follows: The device having been placed with the stump to be pulled just in front of and below the roller C, said roller is turned forward until the levers $a\ a$ rest upon the front cross-piece, B'. The hooks at the ends of the chains F F are made fast to the stump, and the chains brought around the roller and fastened by the pins $d$ in the manner above described. The horses are then hitched to the end of the rope D and started, drawing the levers $a\ a$ around and winding the chain on the roller, and thus pulling up the stump. It may be found sometimes that the amount of chain thus wound around the rollers will not be sufficient to pull the stump entirely out. In this case the operation is repeated, the chains having been first hitched closer up.

Having thus described my invention, what I claim as new, and desire to secure by Letters Patent, is—

1. In a stump-puller, a roller, C, levers $a\ a$, and sheave E, in combination with chains F and rope D, substantially as and for the purpose set forth.

2. The combination of the roller C, levers $a\ a$, braces $c\ c$, and sheave E, substantially as shown and described.

3. A stump-puller, substantially as set forth, having a roller, C, journaled in bearings $b\ b$ in side pieces, A A', with levers $a\ a$ attached thereto, and provided at their upper ends with a sheave, E, in combination with chains F and ropes, substantially as shown and described.

4. The combination of the rollers C, having trunnions $t$, side pieces, A A', rounded off in front and provided with bearings $b\ b$, cross-pieces B and B', levers $a\ a$, braces $c\ c$, sheave E, rope D, pulley H, and chains F, substantially as and for the purpose set forth.

In testimony whereof I affix my signature in presence of two witnesses.

JAMES D. CHENOWETH.

Witnesses:
WILLIAM H. COLLINGS,
F. M. GUNDY.